UNITED STATES PATENT OFFICE.

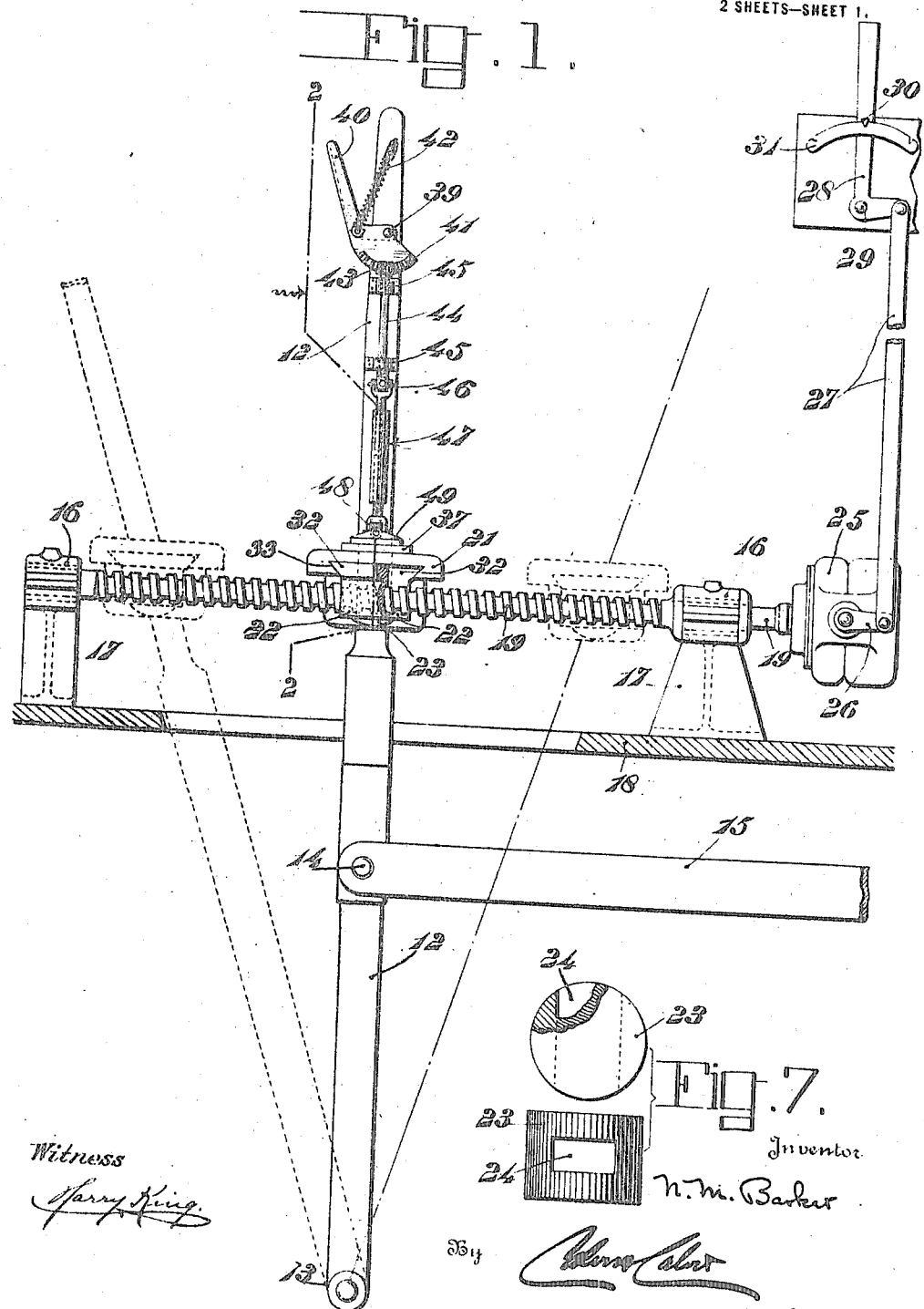

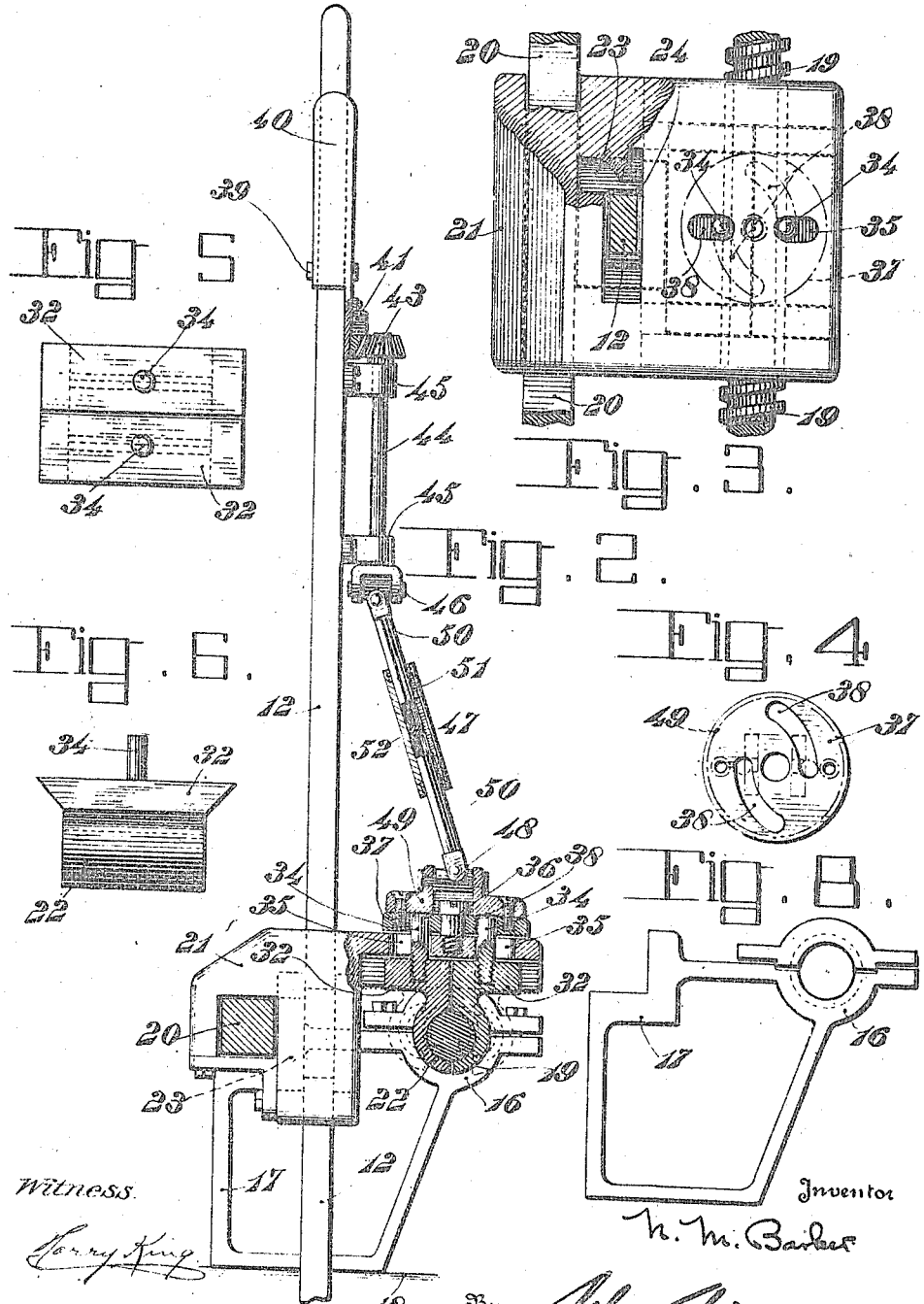

NORMAN M. BARKER, OF HOUGHTON, MICHIGAN.

POWER REVERSE-GEAR FOR LOCOMOTIVES.

1,249,299.

Specification of Letters Patent. Patented Dec. 11, 1917.

Application filed June 1, 1917. Serial No. 172,168.

*To all whom it may concern:*

Be it known that I, NORMAN M. BARKER, a citizen of the United States, residing at Houghton, in the county of Houghton and State of Michigan, have invented or discovered certain new and useful Improvements in Power Reverse-Gear for Locomotives, of which the following is a specification, reference being had therein to the accompanying drawings.

This invention relates to devices for operating hand levers and for locking the same in adjusted position. It is herein shown as applied to the reverse lever of a locomotive to which it is particularly applicable, although, as will be obvious, it is capable of use to equal advantage in connection with other controlling or operating levers of a similar nature.

The invention has for its object the provision of improved mechanism whereby a lever of the character referred to may be conveniently operated by power, which is of such a nature as to permit said lever to be manually operated in the usual manner at will without making any changes or adjustments, which is controlled by a secondary lever having movements corresponding in direction to those of the main lever, which can be readily installed in the locomotive cab or other place in which it is to be used, and which is powerful, rapid, and capable of great refinement of adjustment.

The foregoing and other objects of the invention, together with means whereby the same may be carried into effect will best be understood from the following description of one form or embodiment thereof illustrated in the accompanying drawings. It will, however, be understood that the particular construction and arrangement described and shown has been chosen for illustrative purposes merely, and that the invention, as defined by the claims hereunto appended, may be otherwise practised without departing from the spirit and scope thereof.

In said drawings:

Figure 1 is a side elevation of the complete mechanism.

Fig. 2 is an enlarged sectional view taken substantially on the line 2—2 Fig. 1.

Fig. 3 is a plan view, partly broken away, of the cross head and associated parts.

Fig. 4 is a plan view of the cam for operating the split nut.

Figs. 5 and 6 are a plan and side elevation, respectively, of the split nut.

Fig. 7 is a detail of the rotatable block in the cross head.

Fig. 8 is a detail of one of the uprights.

12 denotes a locomotive reverse lever fulcrumed at 13 and connected at 14 to the usual reach rod 15. 19 denotes a horizontally disposed lead screw arranged adjacent the lever 12 and extending in the general direction of the movement of said lever on its fulcrum 13. The lead screw is journaled in fixed bearings 16 supported by brackets or uprights 17 secured to the cab floor 18 or other fixed part. The uprights 17 also support a guide bar 20 arranged parallel to the lead screw 19 and preferably located at the opposite side of the lever 12 therefrom. Slidably mounted on the guide 20, for movement longitudinally thereof, is a cross head 21 carrying a split nut 22 normally in threaded engagement with the lead screw 19. Rotatably mounted in a suitably formed recess in the cross head 21 is a disk or relatively flat cylindrical block 23 having a substantially diametric opening 24 (see particularly Fig. 7) through which the lever 12 passes and in which said lever is free to slide longitudinally. The arrangement is such that, when the lead screw 19 is rotated, engagement of the split nut 22 therewith causes the cross head 21 to be moved longitudinally of the guide bar 20, carrying with it the lever 12. During this movement said lever is turned or swung on its pivot or fulcrum 13, the disk 23 turning in the cross head 21 in accordance with the varying angular position of the lever 12, and said lever sliding in the opening 24 to compensate for the varying distance between the pivot 13 and cross head 21 due to the rectilinear movement of the latter.

For rotating the lead screw 19 there is provided a reversible motor 25 which, for the purposes of the present invention, may be an electric, steam, or other motor of any well known type. Preferably, however, a compressed air motor is employed, as a motor of this type may conveniently and economically receive its power from the air brake system. Such motors, being well known, do not require description in detail herein. The motor 25 is provided with a suitable controlling or reversing valve or switch having an operating arm 26 movable into opposite positions to cause said motor to rotate the lead screw 19 in opposite directions, respectively, or into an intermediate position to cause said motor and screw to remain at rest. The arm 26 is connected by a link 27 with a controlling lever 28 (herein shown in the form of a bell-crank) pivoted at 29 in any position convenient to the engineer or operator. The lever 28 is preferably retained in adjusted position by a latch 30 and locking segment 31 of well known form. The arrangement is such that with the controlling lever in the intermediate position shown in Fig. 1 the arm 26 will also be in its intermediate position, and the motor 25 and said lead screw 19, and consequently the lever 12, will be at rest, while movement of the lever 28 in either direction from this position will cause, through the motor 25, a suitable rotation of the lead screw 19 to move the lever 21 in the same direction.

The two sections of the split nut 22 are formed with flared or dove-tailed heads or extensions 32 which slide in an undercut or dove-tailed guide 33 on the under side of the cross head 21 and extending in a direction transverse to the lead screw 19 and guide bar 20. Projecting from the heads 32 are pins or studs 34 which extend through slots 35 in the cross head 21. Pivoted on a stud 36, on top of the cross head 21, is a cam 37 having slots 38 coöperating with the pins 34. As will be seen, by rotating the cam 37 the sections of the split nut 22 may be moved in their guides and thereby brought together or separated to engage or disengage the lead screw 19, as shown in full and dotted lines respectively, Fig. 2.

Pivoted at 39 to the lever 12 is a latch lever 40 having a bevel gear segment 41 normally held in the position shown in Fig. 1, by a spring 42. The segment 41 meshes with a bevel gear 43 on the upper end of a shaft 44 journaled in brackets 45 secured to the lever 12. Connected by a gimbal joint 46 with the lower end of the shaft 44 is a section of telescopic shafting, designated as a whole in Fig. 1, by the numeral 47, and connected at its lower end by a second gimbal joint 48 with a cap 49 secured by screws or otherwise to the cam 34. The telescopic section 47, as shown in Fig. 2, comprises two rods or stems 50 connected by, and having a splined or equivalent connection with, a sleeve 51, said sleeve as shown, having a central transverse pin 52 adapted to engage the upper end of the lower rod 50 for the purpose of retaining the sleeve in proper position on the two rods. The parts 46, 47 and 48 constitute a universal telescopic joint or connection whereby rotation of the shaft 44 is transmitted to the cam 37, the telescopic section thereof permitting variations in the distance between the shaft 44 and cam 37, due to the variable longitudinal position of the lever 17, with respect to the cross head 21, while the gimbal joints permit variations in the relative angular positions of said lever and cross head, due to the swinging movement of the former and the rectilinear movement of the latter.

The operation of the device is as follows: As shown in Fig. 1, the lever 12 is in a substantially central position and is at rest in this position by reason of the fact that the controlling lever 28 is in its intermediate position, so that the motor 25 and lead screw 19 are at rest. The arrangement of the parts is such that the spring 42, acting through the latch lever 40 and connections, tends to hold the sections of the split nut 22 in engagement with the screw 19, so that when said screw is at rest the lever 12 is locked in adjusted position. In order to swing the lever 12 about its pivot 13 in either direction, for example, toward the left, as shown in dotted lines Fig. 1, the controlling lever 28 is moved toward the left, thereby starting the motor 25 and causing the same to rotate the screw 19 in the direction to move the lever 12 in the desired manner.

It will be seen that the lead screw 19 when at rest coöperates with the split nut 22 to perform the functions of the usual locking segment and latch employed in connection with levers of this character. The lever 12 may therefore, at any time, be operated by hand in the usual manner, by first manipulating the latch lever 40 to cause the sections of the split nut to disengage the lead screw. Upon releasing the latch lever 40 the spring 42 causes the sections of the split nut to reëngage the lead screw in the new position into which the lever 12 has been adjusted. It will therefore be seen that any accident to the motor 25 will not in any event disable the reversing mechanism, since, in such an event, the reversing lever can, without adjustment, be readily operated by hand in the usual manner for the balance of the trip. The motor 25 will preferably be of a standardized type, so that a disabled motor can be easily and quickly replaced by a new one upon arrival at the destination.

Having thus described my invention, I claim:

1. The combination with a hand lever of the character described, of a lead screw, means detachably connecting said lever and screw whereby rotation of said screw causes said lever to be swung upon its pivot, and a reversible motor for rotating said lead screw.

2. The combination with a hand lever of the character described, of a lead screw, means detachably connecting said lever and screw whereby rotation of said screw causes said lever to be swung upon its pivot, a reversible motor for rotating said lead screw, and a controlling lever for said motor having movements corresponding in direction to the movements of said first named lever.

3. The combination with a lever mounted to swing on a fixed pivot, of a lead screw mounted in fixed bearings adjacent said lever, and means connecting said lever and screw whereby rotation of said screw causes said lever to be swung upon its pivot.

4. The combination with a hand lever mounted to swing on a fixed pivot, of a lead screw mounted in fixed bearings adjacent said lever, means detachably connecting said lever and screw whereby rotation of said screw causes said lever to be swung upon its pivot, and a reversible motor for rotating said lead screw.

5. The combination with a lever of the character described, of a lead screw mounted in fixed bearings adjacent said lever, a longitudinally movable member having a part in threaded engagement with said screw, and a member rotatably mounted on said first named member and having sliding engagement with said lever.

6. The combination with a lever of the character described, of a lead screw mounted in fixed bearings adjacent said lever, a longitudinally movable member having a part in threaded engagement with said screw, and a disk rotatably mounted in said member and having a diametric opening in which said lever slides.

7. The combination with a lever of the character described, of a lead screw mounted in fixed bearings adjacent said lever, a fixed guide arranged parallel to said lead screw, a cross head slidably mounted on said guide and having a part in threaded engagement with said screw, and a member rotatably mounted on said cross head and having sliding engagement with said lever.

8. The combination with a lever of the character described, of a lead screw mounted in fixed bearings adjacent said lever, a fixed guide arranged parallel to said lead screw, a cross head mounted on said guide and having a part in threaded engagement with said screw, and a disk rotatably mounted in said cross head and having a diametric opening in which said lever slides.

9. The combination with a lever of the character described, of a lead screw, a split nut on said lead screw, having operative connection with said lever, and means, including a member carried by said lever, for causing said nut to engage and disengage said screw.

10. The combination with a lever of the character described, of a lead screw, a guide arranged parallel to said screw, a member slidably mounted on said guide and operatively connected with said lever, a split nut on said member having threaded engagement with said lead screw, and means, including a member carried by said lever, for causing said nut to engage and disengage said screw.

11. The combination with a lever of the character described, of a lead screw, a split nut on said lead screw having operative connection with said lever, and a cam for relatively moving the sections of said nut to cause the same to engage and disengage said screw, and means carried by said lever for operating said cam.

12. The combination with a lever of the character described, of a lead screw, a guide arranged parallel to said lead screw, a member slidably mounted on said guide and operatively connected with said lever, a split nut on said member having threaded engagement with said lead screw, a cam for relatively moving the sections of said nut to cause the same to engage and disengage said screw, and means carried by said lever for operating said cam.

13. The combination with a lever of the character described, of a lead screw mounted in fixed bearings adjacent said lever, a guide arranged parallel to said screw, a member slidably mounted on said guide, a second member rotatably mounted on said first named member and having a sliding engagement with said lever, a split nut carried by said first named member and having threaded engagement with said lead screw, and a cam for relatively moving the section of said nut to cause the same to engage and disengage said screw.

14. The combination with a lever of the character described, of a lead screw mounted in fixed bearings adjacent said lever, a fixed guide arranged parallel to said lead screw, a cross head slidably mounted on said guide, a disk rotatably mounted on said member and having a diametric opening in which said lever slides, a split nut carried by said cross head and having threaded engagement with said lead screw, and a cam for relatively moving the sections of said nut to cause the same to engage and disengage said screw.

15. The combination with a lever of the character described, of a lead screw, a split nut on said lead screw having operative connections with said lever, a cam for relatively moving the sections of said nut to cause the same to engage and disengage said screw, and a latch lever on said first named lever and operatively connected with said cam.

16. The combination with a lever of the character described, of means for locking the same in adjusted position, a latch lever pivoted to said first named lever and having a bevel gear segment, a shaft journaled on said first named lever and having a bevel gear meshing with said segment, and means operated by said shaft for operating said locking means.

17. The combination with a lever of the character described, of a lead screw mounted in fixed bearings adjacent said lever, a longitudinally movable member having a threaded part normally in engagement with said screw, a member rotatably mounted on said first named member and having sliding engagement with said lever, means for moving said threaded part into and out of engagement with said screw, means on said lever for operating said moving means, and means including a telescopic joint for operatively connecting said operating means and moving means.

18. The combination with a lever of the character described, of a substantially straight member arranged adjacent said lever, means for locking said lever to said member, means on said lever for operating said locking means and means, including a telescopic joint, for operatively connecting said operating means and locking means.

19. The combination with a lever of the character described, of a lead screw mounted in fixed bearings adjacent said lever, a longitudinally movable member having a threaded part normally in engagement with said screw, a member rotatably mounted on said first named member and having sliding engagement with said lever, means for moving said threaded part into and out of engagement with said screw, means on said lever for operating said moving means, and means, including a telescopic joint, for operatively connecting said operating means and moving means.

20. The combination with a lever of the character described, of a substantially straight member arranged adjacent said lever, means for locking said lever to said member, a latch lever pivoted to said first named lever and having a bevel gear segment, a shaft journaled on said first named lever and having a bevel gear meshing with said segment, and a universal telescopic joint connecting said shaft and locking means.

21. The combination with a lever of the character described, of a lead screw, a split nut on said lead screw having operative connection with said lever, a cam for relatively moving the sections of said nut to cause the same to engage and disengage said screw, a latch lever pivoted to said first named lever and having a bevel gear segment, a shaft journaled on said first named lever and having a bevel gear meshing with said segment, and a universal telescopic joint connecting said shaft and cam.

In testimony whereof I affix my signature.

NORMAN M. BARKER.

Copies of this patent may be obtained for five cents each, by addressing the "Commissioner of Patents, Washington, D. C."